3,254,401
PROTECTION AND LUBRICATION OF METALS AT HIGH TEMPERATURES

Robert H. Dalton and Peter Grego, Corning, N.Y., assignors to Corning Glass Works, Corning, N.Y., a corporation of New York
No Drawing. Filed July 10, 1964, Ser. No. 381,903
9 Claims. (Cl. 29—423)

This invention relates to a method of protecting and lubricating a metal body at elevated temperatures. More particularly, it relates to a method of protecting a metal body from oxidation at elevated temperatures through the use of a fibrous refractory material in combination with a softer glass.

It is known to employ vitreous lubricating agents, particularly glasses and enamels to protect metals from oxidation and to serve as a lubricant during hot metal working operations such as extrusion or forging. Operations of this nature are of necessity conducted at relatively high temperatures. Operating temperatures may vary from about 420° C. for soft metals such as aluminum or magnesium, up to around 1370° C. for certain steels and even higher temperatures for more refractory metals such as molybdenum or tungsten.

Organic type lubricants are generally ineffective at these elevated temperatures and inorganic salts find little use because of their high fluidity or low viscosity in the molten state. Vitreous materials, on the other hand, have a high viscosity in the molten state and, like organic lubricants, become progressively softer or less viscous with increasing temperatures. Further, the plastic or fluid state occurs at the elevated temperatures required for metal working. Also, vitreous materials do not undergo chemical changes such as oxidation or decomposition at these temperatures, nor do they volatilize objectionably.

However, difficulty is commonly experienced in retaining a continuous coating of vitreous material on a metal work piece during the heat up period prior to a hot metal working operation. As the metal is heated during this preheat period, the vitreous coating becomes progressively less viscous and tends to flow down the side of the metal breaking the continuity of the coating and leaving exposed metal surfaces. The present invention is concerned primarily with the problem of retaining a continuous protective coating on metal work pieces during the preheat period.

The aforementioned problems are overcome by the process of the present invention which comprises covering a metal body, prior to heating, with a composite coating of refractory materials comprising, in combination, an inner layer of soft glass and an outer covering of a fibrous refractory material, having a higher softening point than the glass of the inner layer. The invention may be practiced, for example, by coating the metal body with the softer glass powder and then applying an outer wrapping of a cloth of harder glass, such as a high silica glass. As the metal is heated, the softer glass fuses, forming a protective layer about the metal body. The glass cloth serves to hold the inner glass coating in place and prevent it from flowing down the side of the metal. In addition, as the temperature is increased, the harder glass fibers are gradually dissolved by the softer glass adjacent to the metal. The result is an increase in viscosity of the inner glass and a lessening of the tendency to flow. In this manner, the protective glass coating is retained during the preheat period and may serve as a lubricant during subsequent hot working operations. A further advantage is obtained in that the fibrous material serves as an outer binder to prevent the glass powder from falling or flaking off from ordinary handling, prior to the fusion of the glass.

For purposes of the present invention, the term "fibrous refractory material" is intended to mean a flexible, sheet-like material, formed of inorganic refractory fibers. The material may be a woven or nonwoven cloth, matting, fabric tape or other suitable form of refractory fibers. However, the material must have a higher softening point than the glass powder. Preferred materials for use in the method of the present invention, are those composed of high silica, refractory, glass fibers, such as the type described in U.S. Patent 2,461,841 to M. E. Nordberg. Such materials are commonly composed of greater than 94%, by weight, $SiO_2$.

Materials fabricated from mineral fibers, e.g. asbestos, may be used, but in general are less satisfactory. Such mineral fibers are generally composed of short strands and tend to break up or crumble at elevated temperatures. In addition, the mineral fibers are, for the most part, more difficultly soluble and as a result may not be as suitable for the purpose of maintaining a high viscosity in the inner fused glass layer.

The inner layer of softer glass may be applied directly to the metal workpiece by spraying, brushing, rolling, dipping, etc. either in a molten state or as a dry powder or as a powder slurry. Preferably, however, the softer glass is applied as a powder to the refractory fibrous material and both materials are then applied to the metal body by wrapping or otherwise covering the metal body with the resulting composite material. The powdered glass may be conveniently applied in the form of a slurry which may be sprayed, brushed, spread or otherwise coated on the fibrous material.

Various glass compositions may be used to provide the inner layer of glass. The selection of a particular glass composition will be governed by the temperature-viscosity characteristics required for the subsequent metal-working operation. A glass may be selected which will have the proper temperature-viscosity characteristics to serve as a lubricant at the working temperature. In general, harder or higher melting glasses will be used for the more refractory metals, such as molybdenum and tungsten and lower melting glasses for the less refractory metals, such as the bronzes, magnesium or aluminum. However, a glass should be selected which will soften below the temperature at which rapid and objectionable oxidation will occur in the particular metal to be protected. Such softening will occur, within practical time limits, when the viscosity of the glass is less than about 1,000,000 poises. At this viscosity the glass is sufficiently fluid to coalesce and wet the metal surface, to form a continuous, protective layer.

For purposes of lubrication, when the working temperature is reached the glass should preferably be within a viscosity range of 100 to 1000 poises. At elevated temperatures, according to the present invention, at least a portion of the harder glass wrapping will fuse into the inner glass to provide a layer of glass within the desired viscosity range for lubrication.

The following specific examples will serve to further illustrate the invention and the manner in which it may be practiced.

Example 1

| Oxide constitutent: | Percent by weight |
|---|---|
| $SiO_2$ | 73.1 |
| $Na_2O$ | 17.0 |
| $K_2O$ | 0.4 |
| $CaO$ | 5.2 |
| $MgO$ | 3.5 |
| $Al_2O_3$ | 0.8 |

A glass of the above composition was ground to a −325 mesh powder and an aqueous slurry of the powder was prepared by adding water in a ratio of about 150 cc. of water to 300 grams of glass powder. A quantity of the slurry was then applied to a woven glass cloth having a composition of greater than 99% $SiO_2$. The slurry was applied by brushing on one side of the glass cloth, forming a layer about 1 mm. thick on the cloth and becoming embedded in the mesh of the weave. The cloth was then partially air-dried. A billet, 3 inches in height and 3 inches in diameter, of SAE No. 4340 steel was covered with a double wrapping of the impregnated cloth. The top of the billet was covered with a disc of the impregnated cloth. The cloth was placed on the billet with the coated side of the cloth facing inward, toward the metal. The billet was then placed on a double layer of slurry coated cloth to protect the bottom portion, and the coated billet was dried at about 200° C. The dried cloth contained about ½ lb. of powdered glass per square foot of cloth.

The covered billet was then placed in a heated furnace. After the temperature became stabilized at 1200° C., the billet was heat-soaked for two hours.

At the end of the heat schedule, the billet was examined. The exterior of the coating was semi-plastic and the interior, adjacent to the metal, was more fluid. Further examination showed that the metal surface was practically free from oxidation or scale, and that a low viscosity glass had been retained on the billet to serve as a lubricant for subsequent hot working operations.

*Example 2*

The procedure of Example 1 was repeated except that a billet of SAE No. 1010 steel was employed. Examination of the metal after heating disclosed that the coating had afforded excellent protection from oxidation.

*Example 3*

An aqueous slurry of glass powder was prepared as described in Example 1 except that a ratio of 300 grams of glass powder to 200 cc. of water was employed. The slurry was then sprayed directly on a billet of SAE 4340 steel and dry 99% silica cloth was wrapped around the precoated billet. The billet was then heated in air at 1200° C. for 2 hours. Examination of the billet after heating indicated that the coating had provided considerable protection although some oxidation had taken place.

Subsequent experiments and evaluation indicated that while the procedure of Example 3 is effective, best results are obtained by the procedure of Examples 1 and 2.

It has been further determined that the best protection is obtained by coating the glass-powder slurry on one side of the cloth and placing the cloth on the metal with the coated side of the cloth facing the metal. When this procedure is followed, the lower melting glass fuses and more readily forms a protective coating on the adjacent metal. As the temperature is increased, the higher melting glass cloth is gradually dissolved into the first glass from the inward side of the cloth. In this manner an outer layer of cloth is retained for a longer period of time, affording better protection from ordinary handling during the heating period, and preventing the inner glass layer from flowing away from the metal.

It will be apparent to those skilled in the art that many variations and modifications of the invention as hereinabove set forth may be made without departing from the spirit and scope of the invention. The invention is not to be limited to those details shown above except as set forth in the appended claims.

We claim:
1. A method of protecting a metal body from oxidation while heating to a predetermined elevated temperature which comprises applying to the body composite layers comprising a coating of glass powder which is adjacent to the metal body and which softens at a temperature lower than said elevated temperature and, overlying said layer of glass, a fibrous refractory material which softens at a higher temperature than the glass powder.

2. A method according to claim 1 wherein said fibrous refractory material comprises glass fibers.

3. A method according to claim 2 wherein the composition of said glass fibers is greater than 94% by weight $SiO_2$.

4. A method of protecting a metal body from oxidation while heating to a predetermined elevated temperature which comprises covering said metal body with a fibrous refractory material having applied to its surface facing the metal body a coating of glass powder which softens at a temperature lower than said elevated temperature.

5. A method according to claim 4 wherein said fibrous refractory material comprises glass fibers.

6. A method according to claim 5 wherein said fibrous refractory material is coated on one side only with said glass powder and placed around said metal body with the coated side adjacent to the metal.

7. A method of shaping a metal body at elevated temperatures which comprises the steps of (A) providing a fibrous refractory material, (B) providing a slurry of glass powder, (C) coating one side of the fibrous refractory material with the slurry, (D) covering said metal body with said material, the coated side of the material being positioned adjacent to the metal body, (E) drying the slurry-coated material at a temperature in excess of 100° C., (F) heating the covered metal body to the elevated temperature required for shaping whereby the glass powder is softened to form a fused glass coating around the metal body and the refractory material is gradually dissolved into the fused glass coating, and (G) subjecting the metal body to a shaping operation with the fused glass coating serving as a lubricant for the shaping operation.

8. A method according to claim 7 wherein said fibrous refractory material comprises glass fibers.

9. A method according to claim 8 wherein the composition of said glass fibers is greater than 94% by weight $SiO_2$.

References Cited by the Examiner

UNITED STATES PATENTS

| | | | |
|---|---|---|---|
| 2,538,917 | 1/1951 | Sejournet et al. | 72—42 |
| 2,798,286 | 7/1957 | Anderson | 29—424 X |
| 2,956,337 | 10/1960 | Buffet et al. | 72—42 |
| 3,015,387 | 1/1962 | Evans | 29—424 X |
| 3,039,888 | 6/1962 | Sejournet et al. | 72—42 |
| 3,097,742 | 7/1963 | Lamberty | 72—42 |

WHITMORE A. WILTZ, *Primary Examiner.*

THOMAS H. EAGER, *Examiner.*